United States Patent [19]
Nelson

[11] 3,931,805
[45] Jan. 13, 1976

[54] BARBEQUE GRILL
[75] Inventor: David M. Nelson, Freeport, Ill.
[73] Assignee: King-Seeley Thermos Co., Ann Arbor, Mich.
[22] Filed: Aug. 21, 1974
[21] Appl. No.: 499,289

[52] U.S. Cl. .............................. 126/41 R; 126/25 R
[51] Int. Cl.² .......................................... A47J 37/07
[58] Field of Search .......... 126/41 R, 25 R; 431/329

[56] References Cited
UNITED STATES PATENTS

| | | | |
|---|---|---|---|
| 2,790,434 | 4/1957 | Del Francia | 126/25 R |
| 3,286,620 | 11/1966 | Brown | 126/41 R X |
| 3,295,509 | 1/1967 | Harvey | 126/41 R X |
| 3,437,416 | 4/1969 | Saponara | 431/329 |
| 3,547,097 | 12/1970 | Rice et al. | 126/41 R |
| 3,638,635 | 2/1972 | Drennan | 126/41 R |
| 3,814,573 | 6/1974 | Karlovetz | 431/329 |

*Primary Examiner*—Edward G. Favors
*Attorney, Agent, or Firm*—Harness, Dickey & Pierce

[57] ABSTRACT

A gas fueled barbeque grill comprising a housing, means within the housing for supporting food to be cooked, a burner assembly disposed below the food supporting means, the assembly including a plurality of spaced apart burner elements each including a portion which when supplied with an appropriate ignited mixture of a gaseous fuel and air provides a flameless incandescent heating area, with the burner elements being spaced apart a sufficient degree to provide cooking heat for substantially the entire area of the food supporting grate.

2 Claims, 4 Drawing Figures

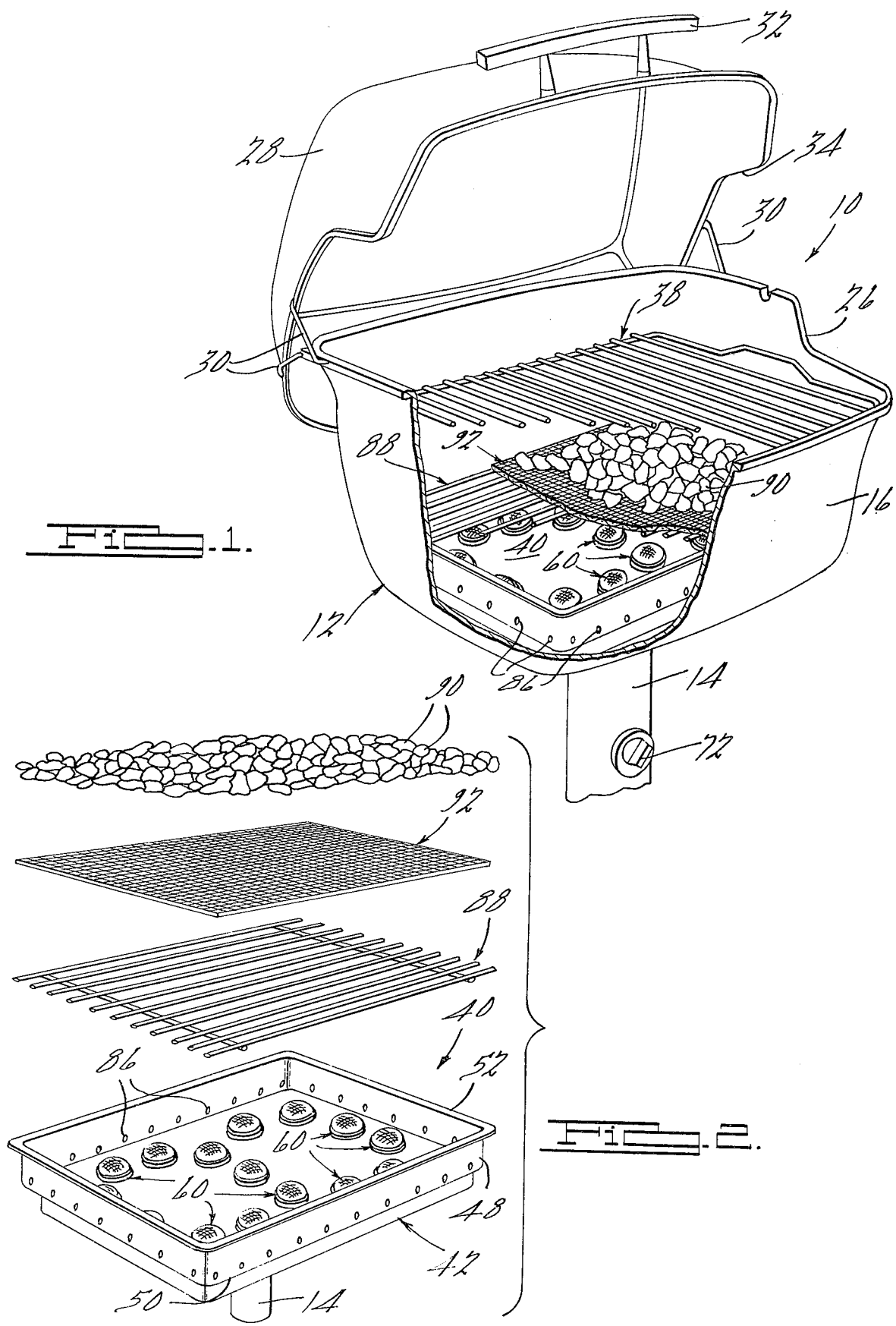

BARBEQUE GRILL

BACKGROUND OF THE INVENTION

It is heretofore been the practice in gaseous fueled barbeque grills of the type using, for example, natural or LP gas, to incorporate Bunsen-type burners below the food supporting grills or grates within the grill housings. Such Bunsen-type burners have been found to operate satisfactory; however, because such large quantites of excess air is required for combustion in Bunsen-type burners, considerable fuel is consummed in heating barbeque grills that utilize the same.

In order to provide a gas fired or fueled barbeque grill which operates more efficiently than those employing Bunsen burners, it has heretofore been proposed to utilize an infra-red or flameless incandescent burner unit within the grill. Such infra-red burner appliances have been found to use significantly less gas in producing the same effective heat output as conventional Bunsen-type burner appliances. Infra-red burner units have the additional advantage that objects can be heated relatively fast; however, the infra-red burner units heretofore known and used have been objectionable from the standpoint that they do not provide for uniform heating over an entire cooking grill or grate and that they have been located above, as opposed to below the food supporting grate. The latter mentioned objection is considered to be serious in that the food drippings do not get burned to provide the smoke that flavors the food being cooked when the burner unit is located above the food. With regard to the former objection, infra-red burner units to date, while providing a greater amount of heat than the comparable Bunsen-type burners, such heat is concentrated in a relatively small area, and accordingly, when a large barbeque grate is to be heated, it is necessary to use two or more complete burners, with each burner having its own gas supply and ancillary control valve.

The present invention is intended to provide a new and improved barbeque grill of the above described type which overcomes the various objectionable characteristics of both Bunsen and infra-red type burner units that have been utilized in the past. More particularly, the present invention provides a novel barbeque grill assembly featuring an improved infra-red burner unit which is intended to provide a large heating area below the food supporting grate and yet minimize fuel consumption to the extreme. The burner unit incorporated in the barbeque grill of the present invention consists of a plurality of spaced apart burner elements, each of which when provided with an ignited mixture of gaseous fuel and air provides a flameless incandescent heating area, with the areas being so located as to provide a large cooking area. An optional layer of a rock-like material may be disposed between the plurality of burner elements and the food supporting grate, which material becomes heated and causes combustion of any food drippings so as to produce smoke for flavoring the food being cooked.

SUMMARY OF THE INVENTION

This invention relates generally to barbeque grills and, more particularly, to a new and improved gas fueled infra-red barbeque grill.

It is accordingly a general object of the present invention to provide a new and improved barbeque grill assembly.

It is a more particular object of the present invention to provide a new and improved gas fueled barbeque grill which features the efficiency of infra-red type burner units with the burner location of conventional Bunsen-type burners.

It is another object of the present invention to provide a new and improved barbeque grill which provides a large heating area below the food supporting grate.

It is still another object of the present invention to provide a new and improved barbeque grill which enables objects heated thereby to have a relatively fast "warm-up" time.

It is still a further object of the present invention to provide a new and improved barbeque grill of the above character which allows complete control and/or elimination of "flare-up" of grease drippings from food being cooked therewithin.

It is another object of the present invention to provide a new and improved barbeque grill unit of a relatively simple design, that is economical to manufacture and which will have a long and effective operational life.

Other objects and advantages of the present invention will become apparent from the following detailed description taken in conjunction with the accompany drawings.

BRIEF DESCRIPTION OF THE DRAWINGS

FIG. 1 is an elevated perspective view, partially broken away, of the barbeque grill assembly in accordance with the principles of the present invention;

FIG. 2 is an exploded assembly view of certain of the interior components of the barbeque grill assembly shown in FIG. 1;

DESCRIPTION OF A PREFERRED EMBODIMENT

Figure 3:
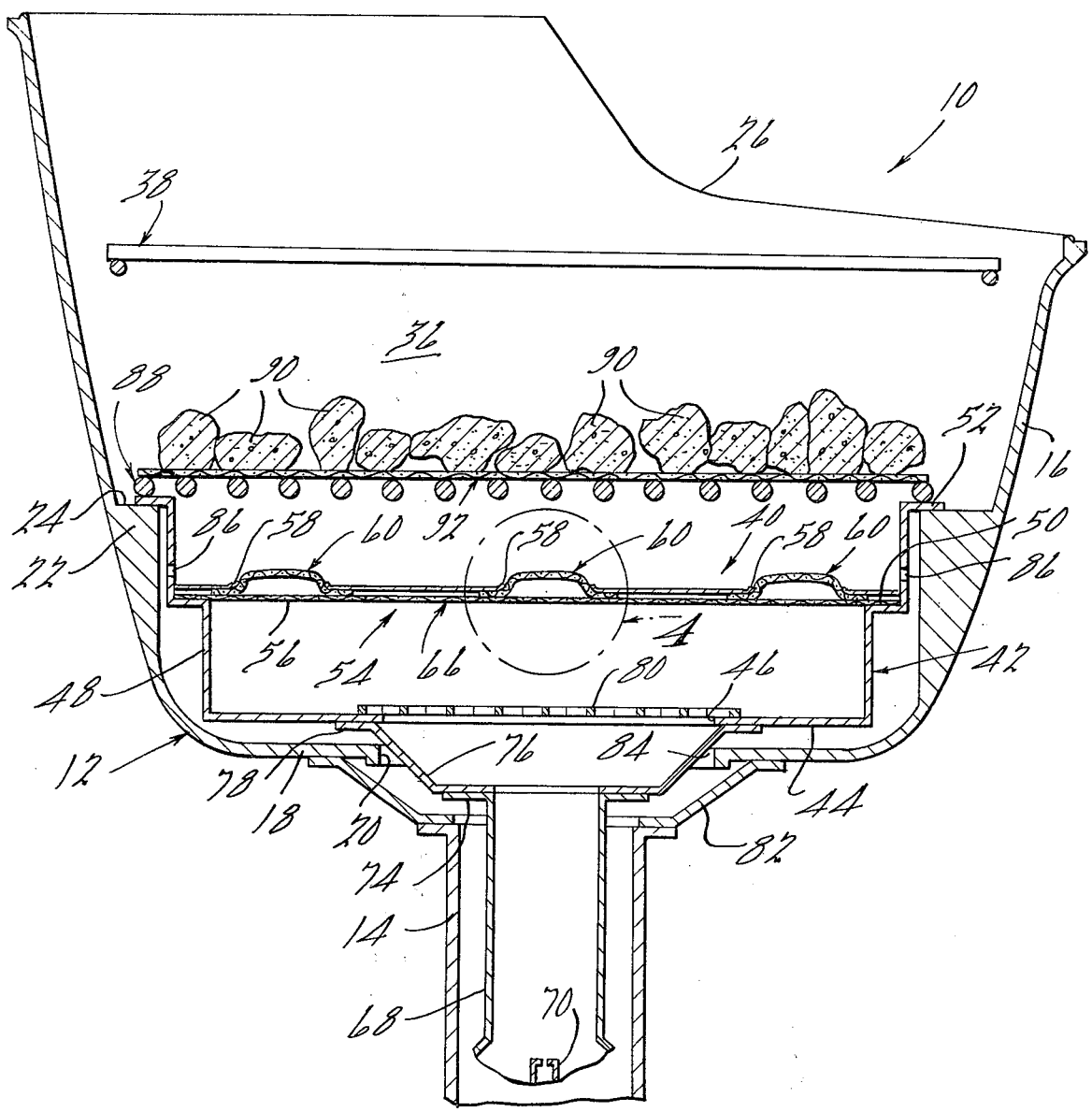
FIG. 3 is a transverse cross-sectional view of a portion of the barbeque grill assembly shown in FIG. 1.

Referring now in detail to the drawings and in particular to FIG. 1 thereof, a gas fueled barbeque grill, generally designated by the numeral 10, in accordance with one preferred embodiment of the present invention, is shown as generally comprising an external housing 12 which is preferably, although not necessarily, fabricated of a lightweight metal, such as cast aluminum or the like, and is operatively supported upon a generally vertically disposed hollow pedestal or support column 14. As is conventional in the art, a gas supply line extends upwardly within the interior of the pedestal 14 and is adapted to be connected to a suitable source of gas fuel, such as natural or LP gas, as is commonly available.

The housing 12 generally comprises a lower housing section or base 16 including a bottom portion 18 which is formed with a central opening 20. Disposed interiorly of the sides of the bottom section 16 is a plurality of inwardly projecting shoulders or fins, generally designated by the numeral 22. The fins 22 define generally horizontally disposed support surfaces 24 which function in a manner hereinafter to be described. The lower housing section 16 is formed with a generally step-shaped peripheral upper edge 26 that is cooperable with an upper housing section or cover, generally designated by the numeral 28. The cover 28 is hingedly connected by suitable hinge means, representatively designated by the numeral 30, to the lower housing section 16 and is adapted to be moved between an open position shown in FIG. 1 and a closed position enclosing the interior of the housing 12. A suitable handle 32 is provided on the forward side of the cover 28 to facilitate opening and closing the same, and the lower peripheral edge 34 of the cover 28 is complementary in shape to the upper edge 26 of the lower housing section 16 so that when the cover 28 is closed, a cooking chamber 36 is provided which is substantially enclosed except for a small vent opening that is located at the rearward side of the housing 12 that permits the exhaust of smoke and similar products of combustion.

Disposed adjacent the upper portion of the lower housing section 16 is a generally horizontally disposed grate 38 which is adapted to operatively supported food that is being cooked within the housing 12. Suitable support means, such as support brackets or the like (not shown), are provided interiorly of the housing section 16 for operatively supporting the grate 38, with such support means, if desired, permitting selective vertical adjustment of the grate 38, as is conventional in the art. Disposed within the interior of the lower housing section 16 is a burner assembly, generally designated by the numeral 40, which is adapted to provide cooking heat below the food supporting grate 38, which burner assembly 40 is constructed in accordance with the principles of the present invention and will hereinafter be described in detail.

Figure 4:
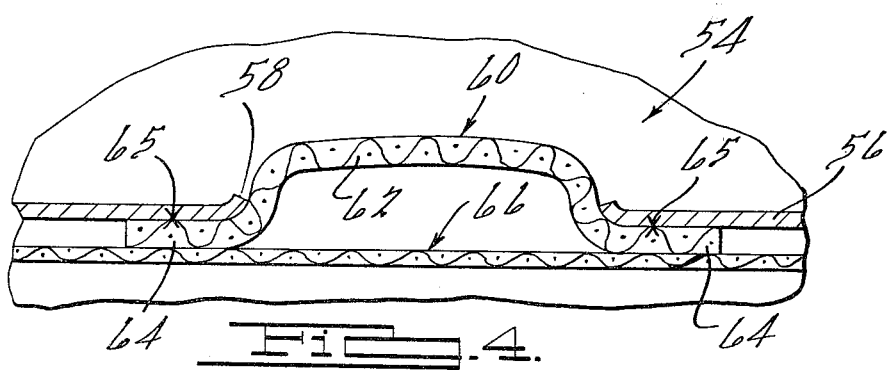
FIG. 4 is an enlarged fragmentary cross-sectional view of the structure shown within the circle 4 of FIG. 3.

Referring now in detail to the construction and operation of the burner assembly 40, as best seen in FIGS. 2–4, the assembly is shown as comprising a burner enclosure, generally designated by the numeral 42, which includes a bottom portion 44 formed with a central opening 46, and integrally connected upstanding, generally step-shaped side portions 48. The enclosure 42 is generally rectangular in shape and the side portions 48 thereof are formed with generally horizonal shoulder 50 directly below a generally outwardly extending horizontal flange portion 52. As best seen in FIG. 3, when the enclosure 42 is mounted within the housing section 16, the flange portion 52 is adapted to bear upon and be supported by the horizontal support surfaces 24 defined by the fins 22. Disposed interiorly of the burner enclosure 42 is an infra-red burner unit, generally designated by the numeral 54, that is coextensive of the burner enclosure 42 and is adapted to be supported upon the horizontal shoulder 50. The burner unit 54 includes a generally rectangular-shaped burner plate which may be fabricated, for example, of stainless steel or other suitable material, and which is formed with a plurality of spaced apart openings, generally designated by the numeral 58. The openings 58 may be arranged in any suitable fashion provided they are spaced in an appropriate pattern so as to provide for even heat distribution to the food supporting grate 38 located thereabove and yet are spaced close enough together to allow flame propagation from one opening 58 to another thereof upon ignition of the gas-air mixture supplied to the housing 12. Disposed within each of the openings 58 is a generally inverted dome-shaped burner element, one of which is shown in detail in FIG. 4 and all of which are generally designated by the numeral 60. Each of the elements 60 includes a central upwardly concave section 62 which extends upwardly through the associated of the openings 58, and with a generally peripheral outwardly projecting flange portion 64 which is adapted to be secured, as by spot welding or the like, as seen at 65 in FIG. 4, to the lower side of the burner plate 56. The elements 60 are fabricated of a wire screen-like material suitable for the high temperature involved, one satisfactory construction of which consists of a number 10 wire mesh fabricated of 0.023 diameter stainless 304 or Inconel wire. Disposed below and extending generally coextensively of the burner plate 56 is a layer of a wire screen, as best seen in FIGS. 3 and 4 and generally designated by the numeral 66. The wire screen is preferably fabricated of a finer wire mesh than the wire screen from which the elements 60 are fabricated, for example, of a number 40 wire mesh constructed of 0.010 diameter wire. In a preferred construction of the present invention, the peripheral edges of the burner plate 56 and wire screen 66 are crimped together or otherwise suitably connected and sealed so as to prevent "flashback" around the periphery of the burner unit 54.

Disposed below the burner enclosure 42 is a generally vertically disposed inlet tube, generally designated by the numeral 68 which is arranged coaxially of the interior of the pedestal 14 and the lower end of which terminates adjacent the upper end of a gas nozzle 70 located within the pedestal 14 and which is communicable with a suitable gas supply line in a manner well known in the art. Means in the form of a suitable manually adjustable gas valve or cock, generally designated by the numeral 72 (see FIG. 1) is provided for controlling the quantity or volume of gas supplied to the nozzle 70. The upper end of the inlet tube 68 is formed with a generally radially outwardly extending flange portion 74 which is secured as by spot welding or the like to an upwardly and outwardly flared connecting member 76. The upper end of the member 76 is in turn formed with a generally outwardly extending flange portion 78 which is adapted to be secured as by spot welding or the like to the bottom 44 of the burner enclosure 42. A baffle member, best seen in FIG. 3 and designated by the numeral 80, extends over the opening 46 in the bottom section 44 of the enclosure 42 and is preferably, although not necessarily, fabricated of expanded metal or the like or is otherwise perforated so as to cause adequate dispersion of the gas-air mixture which travels upwardly within the inlet tube 68 toward the underside of the burner elements 60 in a manner hereinafter to be described.

As best seen in FIG. 3, the entire barbeque housing 12 is supported upon the upper end of the pedestal 14 and is secured thereto by any suitable connecting means, such as by a bracket or the like representatively designated by the numeral 82. When the burner enclosure 42 is supported within the lower housing section 16 in the position shown in FIG. 3, an air passage is provided between the periphery of the opening 20 and the exterior of the connecting member 76 and burner enclosure 42, which air passage permits a very small amount of air to travel upwardly between the interior of the lower end of the housing section 16 and the exterior of the burner enclosure 42, which air may then pass interiorly of the enclosure 42 through a plurality of air ports, generally designated by the numeral 86, that are formed in the side sections 48 of the enclosure 40 at a position directly above the horizontal shoulder 50. The air which is communicated through the ports 86 serves as a secondary air supply means to assure for complete combustion of any of the air-fuel mixture which is communicated to the burner elements 60.

Disposed directly above the burner enclosure 42 and supported upon the flange 52 thereof is an optional generally horizontally disposed grate 88. The grate 88 functions to operatively support an optional layer of a suitable lava-like rock, generally designated by the numeral 90 which becomes heated upon ignition of the air-fuel mixture supplied to the burner assembly 40. If desired, an optional splatter screen fabricated of a suitable wire mesh, is interposed between the underside of the layer of rocks 90 and the upper side of the grate 88, such a screen being shown in the drawings and generally designated by the numeral 92.

Referring now in detail to the overall operation of the barbeque grill of the present invention, at such time as it is desired to prepare food on the barbeque grill 10 of the present invention, the gas valve 72 is turned from an off position to an on position, whereupon gas will be communicated to the nozzle 70. Such gas will be discharged from the nozzle 70 and will combine with air within the inlet tube 68, with this air-fuel mixture being communicated upwardly through the interior of the inlet tube 68 to the baffle 80. The air-fuel mixture will then be dispersed as it passes upwardly through the baffle 80 so that it is evenly distributed to all of the burner elements 60. The operator can then introduce a suitable burning element, such as a match or the like through a suitable access opening (not shown) in the housing section 16. When the burning element is disposed in proximity to one of the burner elements 60, the air-fuel mixture will be ignited, which ignition will propagate from one burner element 60 to another thereof until ignition of the air-fuel mixture occurs at each of the elements 60. Instead of burning with a flame as is the case with conventional Bunsen-type burners, the ignited air-fuel mixture will burn with a flameless incandescence at each of the burner elements 60. The heat thus produced by the elements 60 will be distributed evenly under the entire area of the rock layer 90 which will in turn become heated to provide even distribution of heat beneath the food supported on the grate 38. The layer of rock 90 will function to catch any excess food drippings which may occur during cooking and in the event any drippings do reach the radiant upper surface of the burner elements 60, such drippings will be burned instantly, thus keeping each of the burner elements 60 clean so that they will continue to function properly. Efficient combustion is assured through the addition of secondary air which is communicated through the passage 70 and into the ports 86 of the burner enclosure 42, with the fine screen 66 along with the sealed peripheral edge of the burner plate 56 serving to positively resist flashbacks of the air-fuel mixture. Due to the fact that the burner elements 60 can operate without any excess air, there is not enough air to support a flame from food drippings when the barbeque grill is used in a closed kettle-type operation, i.e., when the cover 28 is closed. Accordingly, unwanted "flare-up" from grease and the like may be eliminated by closing the cover 28 without any sacrifice in the efficiency of operation. It is to be noted that some people desire a certain amount of flare-up for purposes of searing meat and the like. While such searing can be achieved in the grill 10 merely by opening the cover 28, it is contemplated that a controllable air vent (not shown) be provided on the housing 12, preferably on the bottom section 16 thereof. Such an air vent would normally be closed, but if a person wanted to sear the food being cooked, he would merely open the vent to cause flaring of the air-fuel mixture until the desired searing was completed. Thereafter, the vent can be closed to extinguish the flames, with the result that the desired searing is accomplished without having to open the cover 28 and losing significant quantities of heat within the chamber 36.

While it will be apparent that the preferred embodiment illustrated herein is well calculated to fulfill the objects above stated, it will be appreciated that the present invention is susceptible to modification, variation and change without departing from the scope of the invention.

I claim:

1. A pedestal mounted gas fueled barbeque grill comprising, an open upper-ended housing having means defined by a first imaginary horizontal plane for supporting a cooking grate, a burner enclosure disposed within said housing, said enclosure including a bottom wall portion and a peripheral side wall, means within said housing defined in part by a second imaginary horizontal plane spaced vertically below said first mentioned plane engageable with said enclosure for supporting said enclosure within said housing, said burner enclosure being provided with support means defined by a third imaginary horizontal plane spaced vertically below said second mentioned plane, a burner assembly supported upon said support means, means defining a fuel-air mixture inlet opening in said bottom wall portion of said burner enclosure and baffle means interposed between said opening and said burner assembly, whereby an air-fuel mixture supplied through a pedestal supporting said grill and introduced through said opening will be dispersed in a uniform manner towards the underside of said burner assembly, said burner assembly comprising a generally horizontally disposed partition supported at said third mentioned imaginary plane by said support means, said partition being formed with a plurality of spaced apart openings, a plurality of open lower sided, generally cup-shaped burner units associated one with each of said openings, said units being fabricated of a porous screen material and being complementary in shape to said openings and extending upwardly therethrough from the underside of said partition, each of said burner units including a peripheral flange portion engaged with and secured to the underside of said partition around the periphery of the associated of said openings, a layer of a porous wire screen of a smaller mesh size than said burner units disposed below said partition and being generally co-extensive therewith between said support means, and a support grate supported in a position generally coplanar of said second mentioned imaginary plane and having a layer of rock-like material supported thereon for catching any excess food drippings or the like which may be produced when food is being cooked on said first mentioned grate and thereby minimize the transfer of such drippings toward said burner assembly.

2. A gas fueled barbeque grill as set forth in claim 1 wherein said housing is fabricated of a cast metal and wherein said support means defined in part by said second imaginary plane comprises inwardly projecting shoulder means formed integrally of said housing.

* * * * *